United States Patent [19]

Leonard

[11] Patent Number: 5,502,302

[45] Date of Patent: Mar. 26, 1996

[54] SCRATCH-SUPPRESSING SCANNING APPARATUS WITH ASPHERICAL LENS

[75] Inventor: Jacques Leonard, Mortsel, Belgium

[73] Assignee: AGFA-GEVAERT, N.V., Mortsel, Belgium

[21] Appl. No.: 304,556

[22] Filed: Sep. 12, 1994

[30] Foreign Application Priority Data

Sep. 17, 1993 [EP] European Pat. Off. ............. 93202697
Dec. 24, 1993 [EP] European Pat. Off. ............. 93203698

[51] Int. Cl.$^6$ ................................................. H01J 3/14
[52] U.S. Cl. ........................................... 250/234; 359/206
[58] Field of Search ................................ 250/234, 235, 250/236; 359/206, 207, 209, 662, 708, 710, 718; 354/401, 402, 403; 235/462, 472; 358/475, 474

[56] References Cited

U.S. PATENT DOCUMENTS 4,872,755 10/1989 Küchel ..................... 356/360

*Primary Examiner*—Edward P. Westin
*Assistant Examiner*—Que T. Le
*Attorney, Agent, or Firm*—Breiner & Breiner

[57] ABSTRACT

A scanning apparatus for linewise reproducing an image on one face of a transparent image carrier onto light-sensitive means, which comprises support means (10) defining a support surface for the image carrier (12), an elongated light source (21b), a rod-like aspherical lens (23) disposed between said light source (21b) and said support means (10) for focussing said elongated light source onto an image carrier located on said support means, the characteristics of said lens (23) and its position with respect to said support means being such that the illuminating angle ($\alpha$) of an image carrier on said support means (10) is at least 20 angular degrees and that light intensity variations over said angle are smaller than 15%, and an imaging lens (26) for forming an image of a scanned line (24) of an image on said carrier onto said light-sensitive means.

9 Claims, 5 Drawing Sheets

SCRATCH-SUPPRESSING SCANNING APPARATUS WITH ASPHERICAL LENS

BACKGROUND OF THE INVENTION

1. Field of the Invention

The present invention relates to scanning apparatus, in particular to scanning apparatus, in particular to a scratch-suppressing scanning apparatus.

2. Background of the Invention

Scanning apparatus for producing an electrical representation of an image on one face of a transparent image carrier are known. Such apparatus comprises a light source, a support surface for the image, which is movable in one direction, optical means for directing light from the light source onto the image carrier to illuminate a scan line on the image, and an objective lens for projecting a scan line of the image on light-sensitive detection means.

A main problem encountered in scanners is caused by scratches in the transparency, non in particular in its rear side to be projected. The appearance of a scratch results in a white or dark line in the resulting picture, depending upon whether the transparency is a negative or a positive. Each facet of a scratch acts like a prism that refracts light passing through the film. A ray of light that would normally pass through the film and thus illuminate the image on the front side of the film is refracted in a direction deviating from the normal one. Much of the light refracted by scratches in this manner escapes from the original path of the scanning apparatus and is not detected by the photosensors in the case of film scanners. Thus, a streaklike area of the final picture looks as if it would not have been exposed, which means a black line disturbing the image the case of a positive transparency.

One arrangement for reducing the effect of scratches is disclosed in U.S. Pat. No. 4,395,108 of Eastman Kodak Cy. this document teaches scratch-suppressing projection apparatus, which includes an objective lens defining first and second congregate planes and an integrating bar disposed between a condenser lens behind the transparency to be scanned, and light-sensitive means, e.g. photomultipliers. Disadvantages of this apparatus are the limited light output of the illumination source, viz. a flying spot scanner, and the limitation to transparencies of reduced format, such as 135 size.

Another useful arrangement for suppressing scratches is disclosed in U.S. Pat. No. 4,868,383 of Eastman Kodak Cy. This document deals with a linear light source for a film scanner including an elongated cylindrical integrating cavity having diffusely reflective walls and an output slit parallel to the longitudinal axis of the cavity. The diffuse illuminating light is favourable for avoiding the reproduction of scratches, but it has the disadvantage of a reduced yield so that the light output is correspondingly limited.

Still another scanning system is disclosed in U.S. Pat. No. 3,988,537 of A-G Cooley. The illuminating optical system includes a fluorescent lamp, and first and second cylindrical lenses and an illuminating aperture plate. A scanning optical axis is preferably displaced from the illuminating optical axis. A disadvantage of cylindrical lenses is their rather long focal length, and also the very non-uniform light-distribution over their projection angle so that this system is not suited for reducing the effect of scratches.

SUMMARY OF THE INVENTION

Object of the Invention

It is an object of the present invention to provide a scanning apparatus which allows an efficient suppression of scratches in a transparency to be scanned, and which offers a high light yield.

Statement of the Invention

In accordance with the present invention, a scanning apparatus for linewise reproducing an image on one face of a transparent image carrier onto light-sensitive means comprises:

support means defining a support surface for the image carrier.

an elongated light source.

a rod-like aspherical lens disposed between said light source and said support means for focussing said elongated light source onto an image carrier located on said support means, the characteristics of said lens and its position with respect to said support means being such that the illuminating angle of an image carrier on said support means is at least 20 angular degrees and that light intensity variations over said angle are smaller than 15%, and an imaging lens for forming an image of a scanned line of an image on said carrier onto said light-sensitive means.

The term "support means" as used in the present specification stands for a glass plate as well as for a glassless support such as a metal plate with an image-size opening.

The light-sensitive means can be a CCD array, an electrophotographic drum, photographic film or paper, etc.

It will be understood that in the case of an electrophotographic drum or a photographic film or paper, such drum or paper surface has to be displaced during its exposure at a speed in correspondance with the displacement of the transparent image carrier.

According to a preferred embodiment of the invention, the illuminating angle is at least 30° and the intensity variations are smaller than 10%.

According to a suitable embodiment of the invention, the less curved side of said lens faces said support means and the most curved side faces the elongated light source.

According to a suitable embodiment of the invention, the elongate light source is constituted by the output ends of a bundle of optical fibers arranged in a linear array, the input ends being bundled together near an incandescent bulb. Optical light spreading means can be provided at the output ends of said fiber bundle.

Further, a scanning apparatus with a fiber bundle can comprise a light guiding plate having an input end in optical contact with said output ends of said fiber bundle, and an output end forming said elongate light source, thereby to produce a good intermixing of light leaving said fiber bundle. In a suitable arrangement, the lateral ends of said light-guiding plate are light-reflecting and slight converge from the input towards the output end of the plate, thereby to form a compensation for light losses near the lateral ends of the plate.

Where the image is a multi-colour image, the light source should comprise means for generating a plurality of coloured light beams. Thus three beams of different coloured light may be provided in rapid succession, so as to enable the detection means (in the case of CCD's) to observe the image at three different wavelengths and thereby generate electrical signals indicative of the colour of the image at a given point. The plurality of coloured light beams is usefully provided (realised) by positioning a rotating filter holder in front of a pointlike light source, ideally before the light enters an array of optical fibres.

BRIEF DESCRIPTION OF THE DRAWINGS

The invention will be described hereinafter by way of example with reference to the accompanying drawings, wherein.

DETAILED DESCRIPTION OF THE INVENTION

Figure 1:
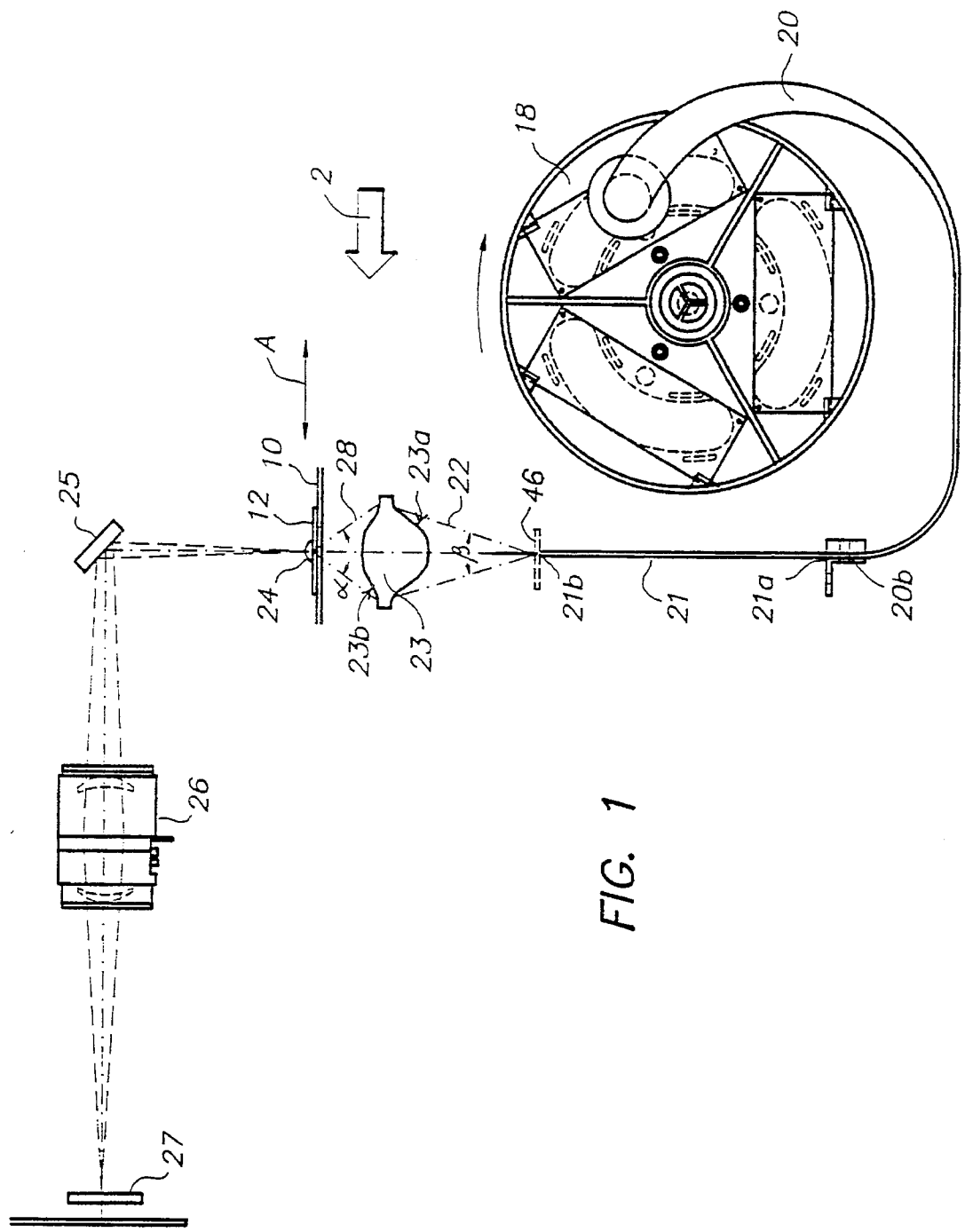
FIG. 1 shows diagrammatically a scanning apparatus according to the invention.
Figure 2:
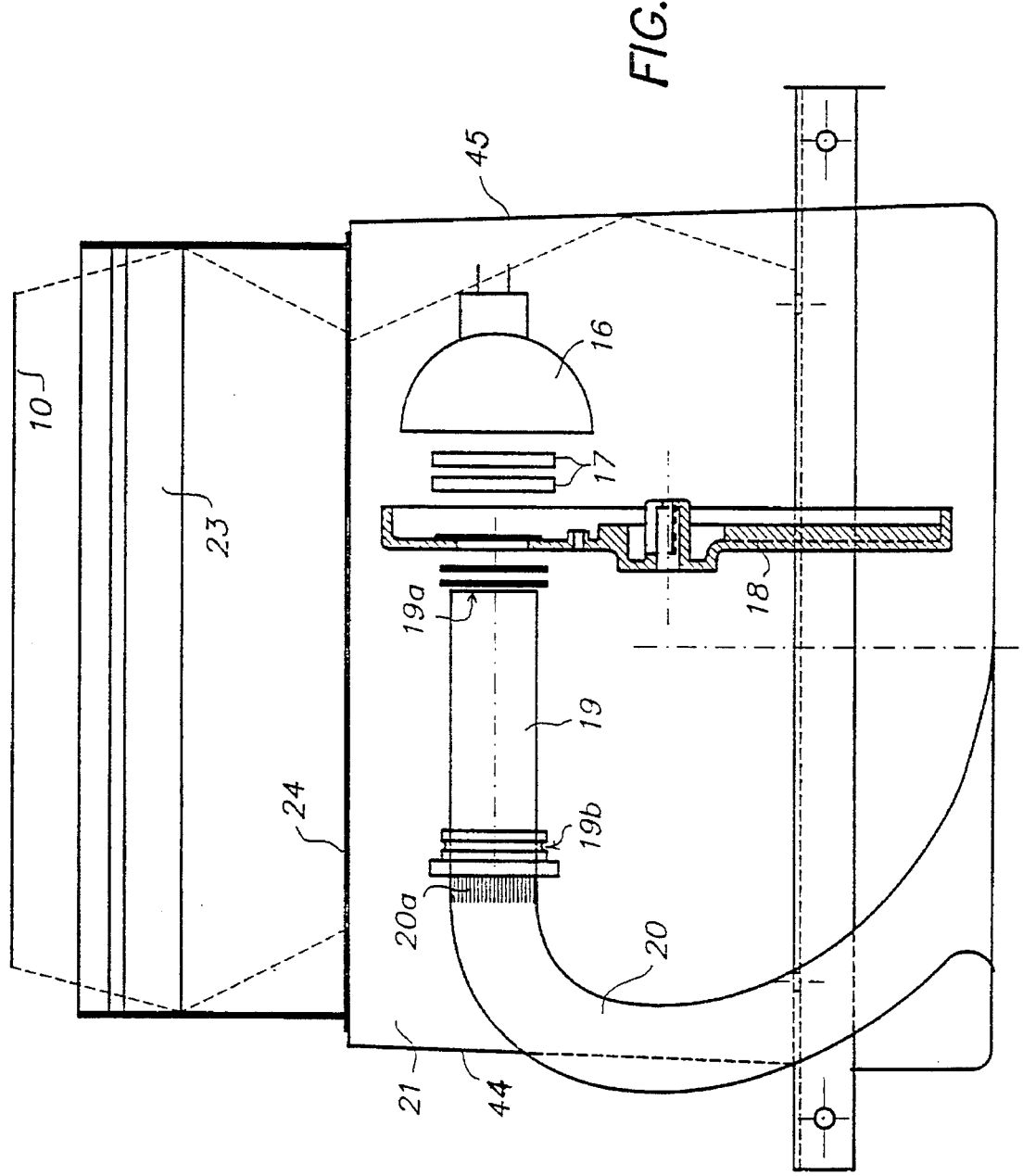
FIG. 2 is a view of the apparatus shown in FIG. 1, taken in the direction 2 in FIG. 1.
Figure 3:
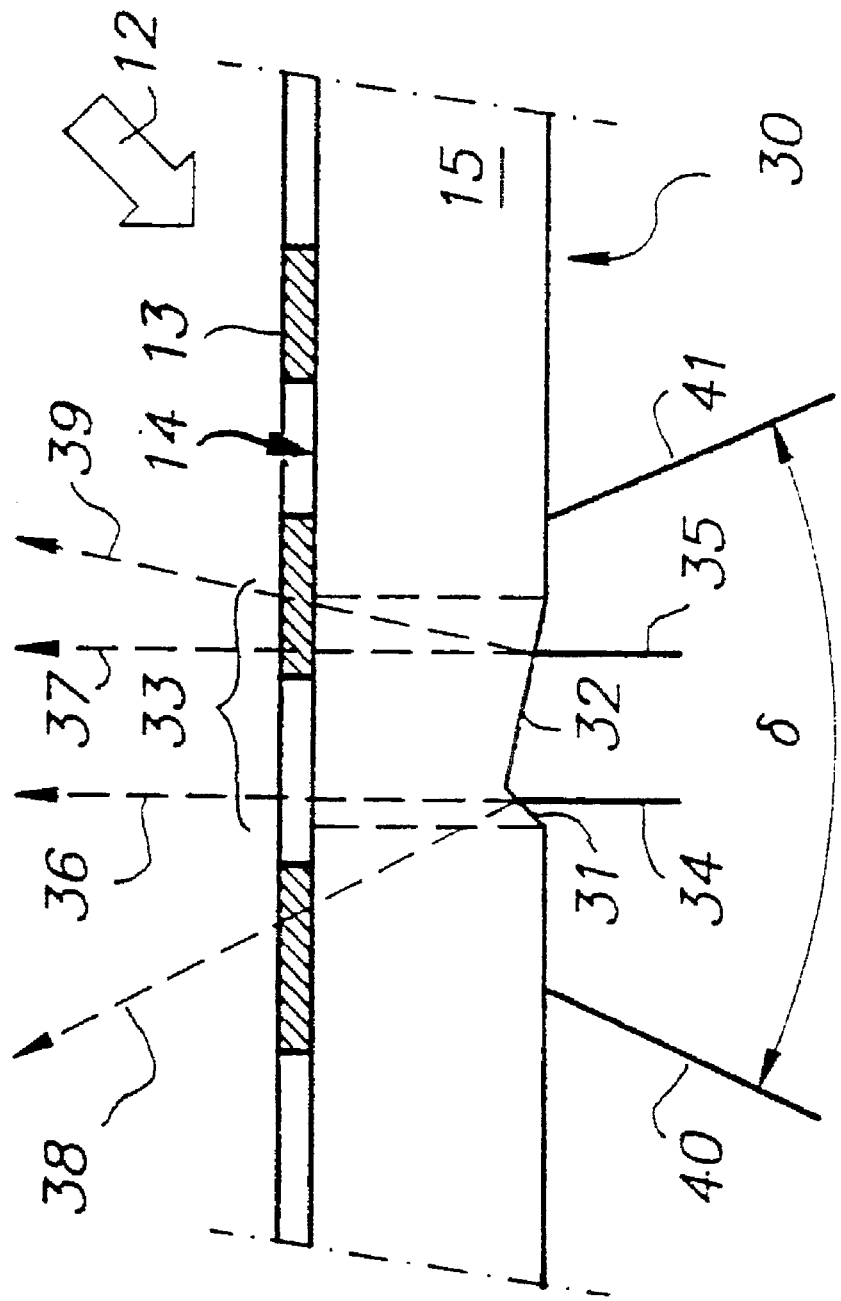
FIG. 3 is an enlarged partial cross-section of a slide bearing at its rear side a scratch.

The scanning apparatus shown in FIGS. 1, 2 and 3 comprises a support surface in the form of a glass plate 10 for a slide 12, the slide having an image 13 carried on an image carrying upper surface 14 of a support 15, e.g. a cellulose triacetate or a polyethylene terephthalate film.

Referring in particular to FIG. 2, a light source in the form of a lamp 16, e.g. a common halogen incandescent lamp with integrated reflector, is arranged in the apparatus below the glass plate 10. A pair of heat filters 17 are positioned in front of the lamp. A filter wheel 18 is mounted for rotation about an axis parallel to the axis of light (radiated by, leaving, exiting) the lamp and comprises a number of angularly spaced coloured filters, usually 3, such that as the filter wheel rotates, the wavelength of the light passing from the filter wheel progresses through a sequence of three coloured light beams.

In front of the filter wheel 18 is a cylindrical light staff 19, so positioned that the light beam from the filter wheel strikes one end 19a thereof. The other end 19b of the light staff is coupled to an input end of a bundle 20 of optical fiber, the fiber being arranged at this end 20a in a cylindrical disposition. At the output end 20b, the optical fiber of the bundle are arranged in a substantially linear, mutually parallel disposition and are optically coupled to the lower edge 21a of a PLEXIGLASS (Trade Mark) plate 21, as can be seen in FIG. 1. The multitude of light beams passing from the fiber optic bundle 20 become thoroughly mixed as they pass through the plate 21 to emerge therefrom at the upper edge 21b thereof as a relatively uniform flat beam of light.

An aspherical rod-like converging lens 23 is positioned beneath glass plate 10. Light emerging from the upper edge 21b of plate 21, which in fact forms an elongated source of light, is focussed by the lens 23 in a line onto the upper surface 14 of the slide. The scanline 24 of the image is deflected over 90° by a mirror 25 and focussed by a lens 26 onto a light-sensitive CCD array 27.

Drive means, not shown, are provided to transport the glass plate 10 in the direction of the double-headed arrow A in FIG. 1, so that the whole image on slide 12 is progressively scanned by the apparatus. In an alternative embodiment, the glass sheet 10 remains stationary and drive means are provided to transport the light source and light detection means, also in the direction of the arrow A.

The lower face 23a of lens 23, that is the face directed towards the upper edge 21b of plate 21, has a greater curvature than that of the upper face 23b positioned towards the slide 12 to enable lens 23 to be positioned close to the slide in such a manner that the angle α of illumination by beam 28 is relatively large as compared with the incident angle β of beam 29 of the elongated light 10 source constituted by end face 21b of plate 21.

FIG. 3 shows a partial cross-section of slide 12 bearing at its rearside 30 a scratch with facets 31 and 32. For example, rays of light 34 and 35, which would normally pass through the film, leaving along dotted lines 36 and 37, is refracted by scratch facets 31 and 32 into respective directions 38 and 39. Light refracted in this manner does not contribute to the illumination of the zone 33 of image 13 corresponding with the location of the scratch, and therefore the reproduction of the image is spoiled by a black streak running through the image (in the case of a positive transparency). It should be understood that the result is the same if the scratch were present in the upper surface 14 of the slide, but in that case the scratch would be present in the image side of the slide and thus spoil the image.

The described defect in the reproduction of the slide can be avoided if illuminating light does not impinge on the slide according to one angle only, as described hereinbefore, but on the contrary, is within a certain range, e.g. within a range of 40° as shown for the angle α comprised between rays of illuminating light 40 and 41. The effect is that illumination of zone 33 occurs as well by rays of light entering rear side 30 of the slide at positions beside the scratch so that finally the loss of light at zone 33 becomes a fraction only of the loss occurring at perpendicular illumination.

The described favourable illumination is obtained by means of aspherical lens 23 which easily allows an illuminating angle of 40° and more to be obtained while separated from the slide which is in favour of a compact construction of the apparatus.

A second aspect of the use of an aspherical lens is that it allows light intensity variations within the illumination angle to be kept small, say smaller than 15%, whereas values even smaller than 5% are obtainable at careful design of the lens.

Figure 4:
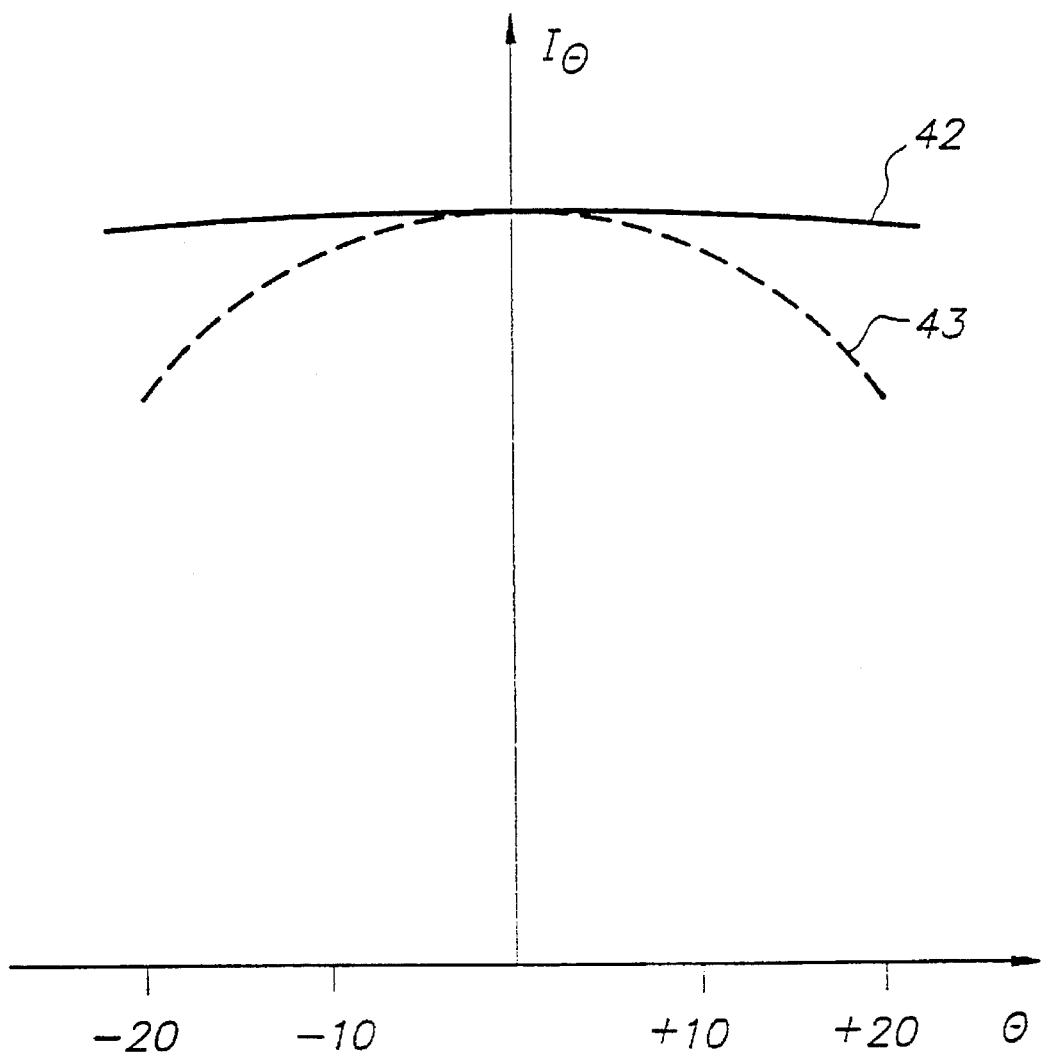
FIG. 4 is a plot of the intensity of light striking the image carrier as a function of the incident angle.
Figure 5:
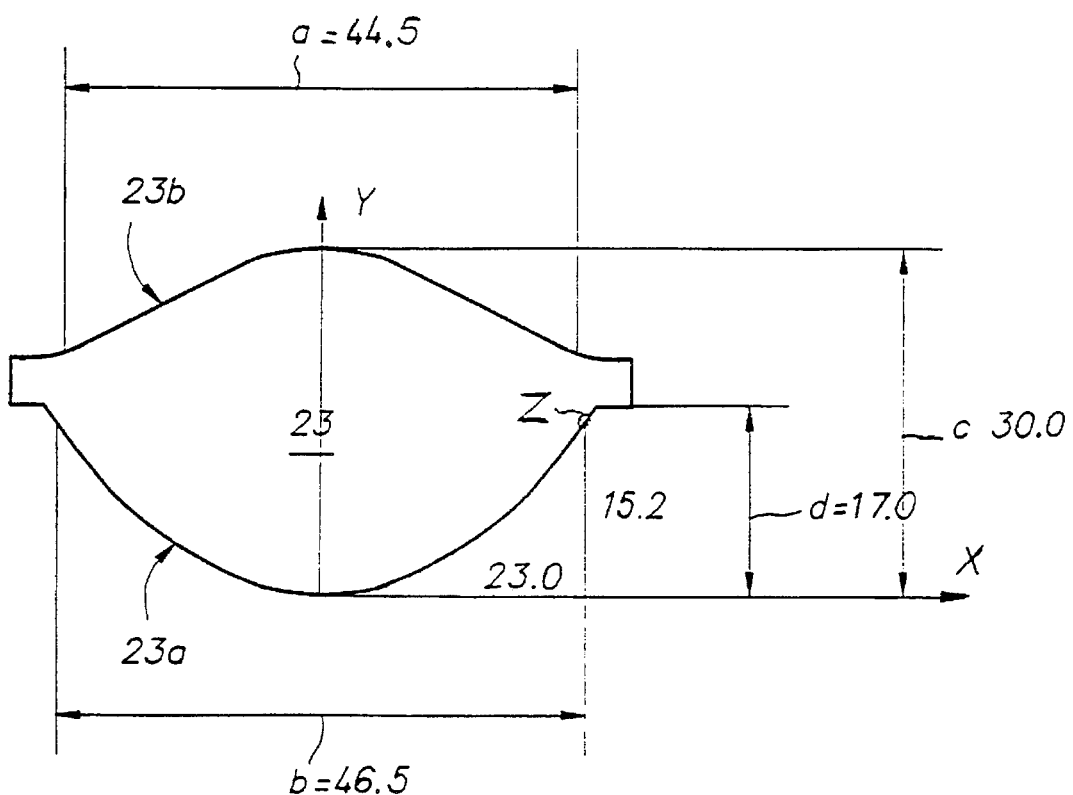
FIG. 5 is an enlarged view of the aspherical lens of the apparatus according to FIG. 1.

FIG. 4 is a diagram of the intensity $I_\theta$ of illuminating light striking the image carrier as a function of the incident angle θ. Curve 42 shows the intensity profile obtained with a rodlike aspherical lens according to the invention. The characteristics of this lens were as follows with reference to FIG. 5:

a: 44.5 mm b: 46.5 mm c: 30.0 mm d: 17.0 mm

The upper and lower profiles 23b and 23a are given by the formula:

$$Y = \frac{A \cdot X^2}{1 + \sqrt{1 - (K+1) \cdot A^2 \cdot X^2}}$$

wherein for the upper profile 23b:

K=−3.8

R=15.42 and wherein for the lower profile 23a:

K=−1.43

R=14.43

A=1/R

The maximum deviation of $I_\theta$ from −20° to +20° was 3%. Curve 43 shows the intensity profile of a cylindrical lens. Deviations of $I_\theta$ now amount up to 30%.

The invention is not limited to the embodiment described hereinbefore with reference to FIG. 3. The outlet of the optical fiber bundle can be provided with spreading means in order to cover the angle β. Such means can be formed by half-cylindrical lenses or by a diffusor plate 46, etc.

The elongated light source must not necessarily be formed by the outlet face 21b of light-guide plate 21, but other sources such as incandescent halogen rod-like lamps, or combinations of incandescent bulbs can be used as well.

The lateral edges 44 and 45 of light guide 21 can slightly converge towards the outlet of the guide as is apparent in FIG. 2, and be light-reflecting, e.g. by polishing. This has the advantage of an increased illumination strength near the lateral ends of the scan line of the image, and forms thereby a certain compensation for a reduced light output of lens 26 near the edges.

I claim:

1. A scanning apparatus for linewise reproducing an image on one face of a transparent image carrier onto light-sensitive means, which comprises:

support means defining a support surface for the image carrier, an elongated light source, a rod-like aspherical lens disposed between said light source and said support means for focusing said elongated light source onto the image carrier located on said support means, the characteristics of said lens and its position with respect to said support means being such that the illuminating angle (α) of the image carrier on said support means is at least 20 angular degrees and that light intensity variations over said angle are smaller than 15%, and an imaging lens for forming an image of a scanned line on said carrier onto said light-sensitive means.

2. A scanning apparatus according to claim 1, wherein the less curved side (23b) of said lens faces said support means and the most curved side (23a) faces the elongated light source.

3. A scanning apparatus according to claim 1, wherein said illuminating angle (α) is at least 30 degrees.

4. A scanning apparatus according to claim 1, wherein said intensity variations are smaller than 10%.

5. A scanning apparatus according to claim 1, wherein said elongated light source comprises an incandescent bulb (16) and a bundle (20) of optical fibers having input ends (20a) bundled together near said bulb and output ends (20b) arranged in a linear array.

6. A scanning apparatus according to claim 5, comprising optical light-spreading means at the output ends (21b) of said fiber bundle.

7. A scanning apparatus according to claim 6, wherein said light-spreading means is formed by a diffusor.

8. A scanning apparatus according to claim 5, which comprises a light-guiding plate (21) having an input end (21a) in optical contact with said output ends of said fiber bundle, and an output end (21b) constituting said elongated light source.

9. A scanning apparatus according to claim 8, wherein the lateral ends of said light-guiding plate slightly converge from the input towards the output end of the plate and are light-reflecting at their inside surface.

* * * * *